United States Patent [19]
Lee et al.

[11] Patent Number: 5,717,967
[45] Date of Patent: Feb. 10, 1998

[54] METHOD AND CAMERA FOR WRITING HAND-GENERATED INFORMATION ON A FILMSTRIP IN THE CAMERA

[75] Inventors: J. Kelly Lee, Rochester; Gerald John Angeli, Fairport, both of N.Y.; Frederick John Jeffers, San Diego, Calif.; Svetlana Reznik, Rochester; Dale Frederick McIntyre, Honeoye Falls, both of N.Y.

[73] Assignee: Eastman Kodak Company, Rochester, N.Y.

[21] Appl. No.: 620,508

[22] Filed: Mar. 22, 1996

Related U.S. Application Data

[60] Provisional application No. 60/006,313, Nov. 7, 1995.
[51] Int. Cl.⁶ ............................................... G03B 17/24
[52] U.S. Cl. ........................... 396/313; 396/319; 396/535
[58] Field of Search ............................... 396/312, 314, 396/319, 429, 535, 538

[56] References Cited

U.S. PATENT DOCUMENTS

| | | | |
|---|---|---|---|
| 1,848,814 | 3/1932 | Allen | 396/313 |
| 5,130,745 | 7/1992 | Cloutier et al. | 396/319 X |
| 5,162,830 | 11/1992 | Schappler et al. | 396/313 |
| 5,170,198 | 12/1992 | Cannon | 396/60 |
| 5,384,664 | 1/1995 | Koehler | 360/3 |

*Primary Examiner*—Howard B. Blankenship
*Attorney, Agent, or Firm*—Charles E. Snee, III; David A. Howley

[57] ABSTRACT

A filmstrip which has a substantially transparent magnetic layer is loaded into a camera. Successive sections of the filmstrip are moved inside the camera to locate corresponding sections of the magnetic layer adjacent an inside face of a magnetic-film-write-on portion of the camera. A hand held stylus is manually moved on an outside face of the magnetic-film-write-on portion, opposite the inside face, to record hand-generated information magnetically on the magnetic layer.

11 Claims, 8 Drawing Sheets

METHOD AND CAMERA FOR WRITING HAND-GENERATED INFORMATION ON A FILMSTRIP IN THE CAMERA

CROSS REFERENCE TO RELATED APPLICATION

Reference is made to and priority claimed from U.S. Provisional Application Ser. No. 60/006,313, filed 07 Nov. 1995, entitled METHOD AND CAMERA FOR WRITING HAND-GENERATED INFORMATION ON A FILMSTRIP IN THE CAMERA.

CROSS-REFERENCE TO RELATED APPLICATION

Reference is made to commonly assigned copending application Ser. No. 08/346,961 filed Nov. 30, 1994.

FIELD OF THE INVENTION

The invention relates generally to the field of photography, and in particular to cameras. More specifically, the invention relates to a method and camera for writing hand-generated information on a magnetic layer of a filmstrip loaded in the camera.

BACKGROUND OF THE INVENTION

U.S. Pat. No. 5,130,745 (the '745 patent) to Cloutier et al. discloses a camera designed to utilize a photographic filmstrip having a virtually transparent magnetic recording layer. A magnetic head in the camera is used to read and/or write information from/to the magnetic layer.

Cameras are also known in the prior art which enable a camera user to optically record hand-written information onto the light-sensitive layer(s) of a photographic film loaded in the camera. For example, in the early part of this century, Eastman Kodak Company made a camera called the Autographic. This camera provided a small metal stylus and a door that allowed access to a paper backing covering the film. The Autographic camera allowed the camera user to write a message with the stylus on the back of the paper covering the film. The pressure from the stylus fogged the film such that after printing, the hand written message could be read on the front of a picture generated from the film. This method of film exposure is known as pressure fogging. U.S. Pat. Nos. 1,848,814 and 5,162,830 disclose other cameras which enable hand-written information to be optically recorded on photographic film loaded in a camera.

Several problems exist with the cameras described in the previous paragraph. At least a portion of the light-sensitive area of the film must be used for optically recording the hand-written information. This portion of the film is thus unavailable for recording an image or part of an image. Further, once the hand-written information is optically recorded on the film, the hand-written information cannot be erased from the film. If a camera operator makes a mistake in recording the information, the mistake cannot be corrected. An additional problem is that the information will always appear in photographs generated from the film. Pictures cannot be generated without the information showing up in the picture, and printing the information on the back of the picture would be quite difficult.

SUMMARY OF THE INVENTION

The present invention is directed to overcoming one or more of the problems set forth above. Briefly summarized, according to one aspect of the present invention, a filmstrip which has a substantially transparent magnetic layer is loaded into a camera. Successive sections of the filmstrip are moved inside the camera to locate corresponding sections of the magnetic layer adjacent an inside face of a magnetic-film-write-on portion of the camera. A hand held stylus is manually moved on an outside face of the magnetic-film-write-on portion, opposite the inside face, to record hand-generated information magnetically on the magnetic layer.

By recording the hand-generated information on the magnetic layer of the film, none of the light sensitive area of the film is occupied by the hand-generated information. As such, the entire light-sensitive area of the film is available for image recording. Further, because the hand-generated information is magnetically recorded, it can be erased and rewritten if a mistake has been made. Additionally, pictures can be created from the filmstrip with the hand-generated information recorded over the image, adjacent the image in a border, or on the back of the picture.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figures 1A, 1B:
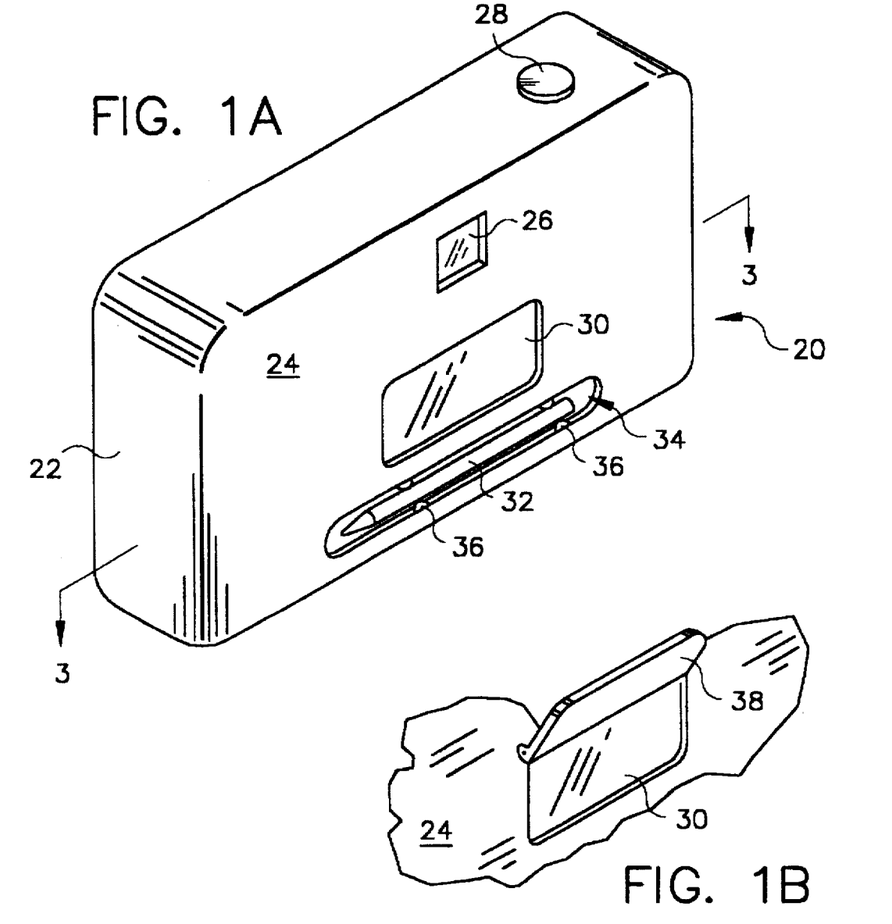
FIG. 1A is a schematic perspective view of the back of a photographic camera.
FIG. 1B is an alternative embodiment of a portion of the camera of FIG. 1A.

Beginning with FIG. 1A, a photographic camera 20 includes a camera body 22 having an opaque rear wall 24. A view finder 26 is used by a camera operator for composing a scene to be recorded on a photographic filmstrip loaded in camera 10. A shutter button 28 is pressed by the camera operator to record an image of the scene on a frame of the filmstrip. A thinned out section of the rear wall, designated as a magnetic-film-write on portion 30 of wall 24, preferably is made of plastic and is about 1 millimeter thick. A magnetic stylus 32 is releasably secured in a recess 34 of back wall 24 by compliant bosses 36. The purpose of write-on portion 30 and magnetic stylus 32 will be explained below.

FIG. 1B discloses an alternative embodiment to FIG. 1A, in which a write-on portion hinged door 38 has been pivotably secured to back wall 24. An over-center spring (not shown) biases door 38 to either a closed position, covering the write-on portion, or an open position exposing write-on portion 38. Door 38 pro-protects the very thin write-on portion from damage (e.g. puncture) when write-on portion is not being used. Alternatively, a sliding door can be used to protect the write-on portion.

Figure 2:
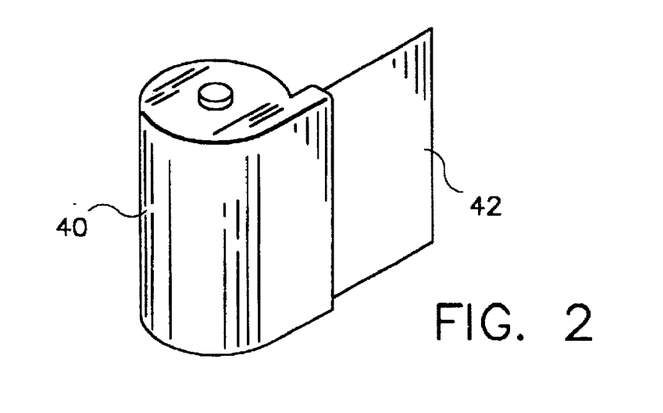
FIG. 2 is a perspective view of a photographic filmstrip having a magnetic layer, and a cartridge for containing the filmstrip.

With reference to FIG. 2, a cartridge 40 is disclosed which houses a photographic filmstrip 42 having a virtually transparent magnetic recording layer. The magnetic layer preferably has a coercivity of less than about 920 oersteds. Such a photographic filmstrip is well known to those skilled in the art and is disclosed in the above-mentioned '745 patent which is incorporated herein by reference thereto. Cartridge 40 is loaded into camera 20, and then filmstrip 42 is advanced from the cartridge to position a frame of the filmstrip in a position to have an image recorded on the frame by the camera.

Figure 3:
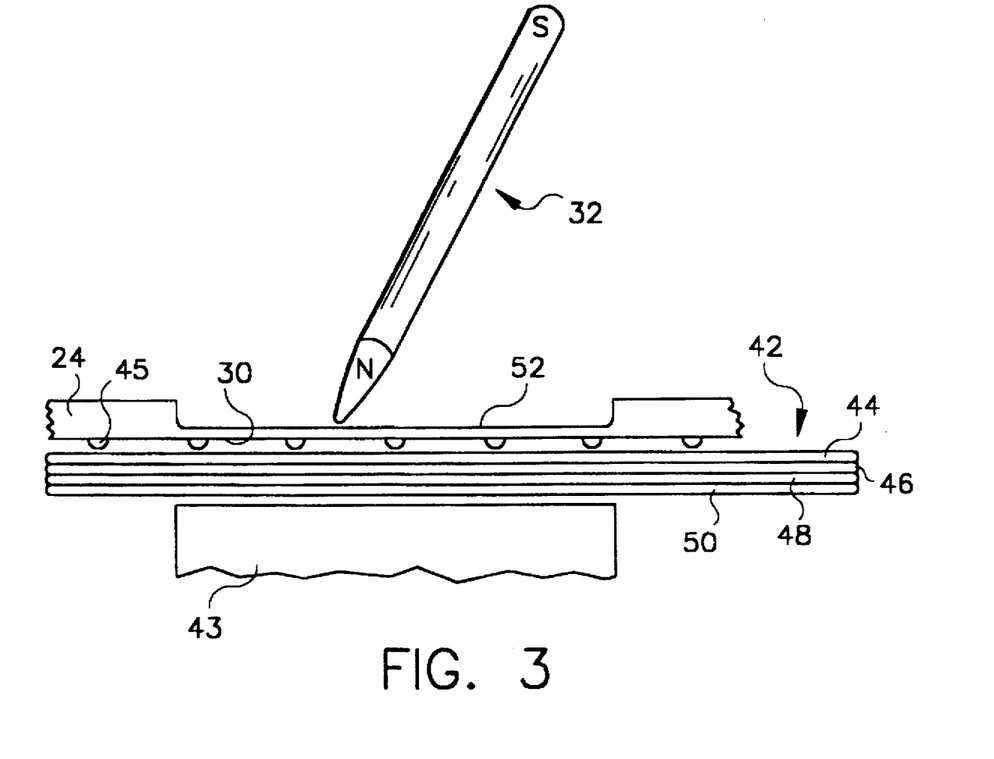
FIG. 3 is a partial sectional view of the camera of FIG. 1A taken along the lines 3—3.

Turning to FIG. 3, a partial sectional view of camera 10 in FIG. 1, loaded with film, is disclosed. A pair of film rails 43 (one is hidden from view) press filmstrip 42 against a multiplicity of dimples 45 located on back wall 24 to hold filmstrip 42 essentially flat in the film plane. Write-on portion 30 thus also acts as a pressure plate in camera 10 and is in very close proximity to filmstrip 42. Dimples 45 allow filmstrip 42 to slide freely between a film gate (not shown) and write-on portion 30. Filmstrip 42 includes a base layer 48, various well-known photo-chemical layers 50 on one side of base 48, and a virtually transparent magnetic layer 46 on the other side of base 48. An anti-static and lubricating layer 44 covers the magnetic layer 46.

Magnetic stylus 32 includes a north pole N and a south pole S. Consequently, stylus 32 emits a magnetic field. When a camera operator desires to write hand-generated information on filmstrip 42, the operator removes the stylus from recess 34 of camera 10, grasps the stylus, positions an end of the stylus on an outer surface 52 of write-on portion 30, and moves the stylus on outer surface 52 in a desired pattern. The magnetic field emitted from stylus 32 is recorded in magnetic layer 46 as the stylus is moved, thereby recording the pattern of hand-generated information on magnetic layer 46. Preferably, stylus 32 emits a magnetic field having a strength exceeding about 920 gauss at magnetic layer 46 when an end of the stylus is in contact with outer surface 52. The stylus may itself be one single magnet or a magnet can be contained within the stylus. Further, the magnet in the stylus may be very long or short as necessary in order to obtain the proper strength and shape of the magnetic field emitted by the stylus. Because the coercivity of magnetic layer 46 is preferably less than 920 oersteds, the path of stylus 32 is recorded in the magnetic layer.

Figure 4:
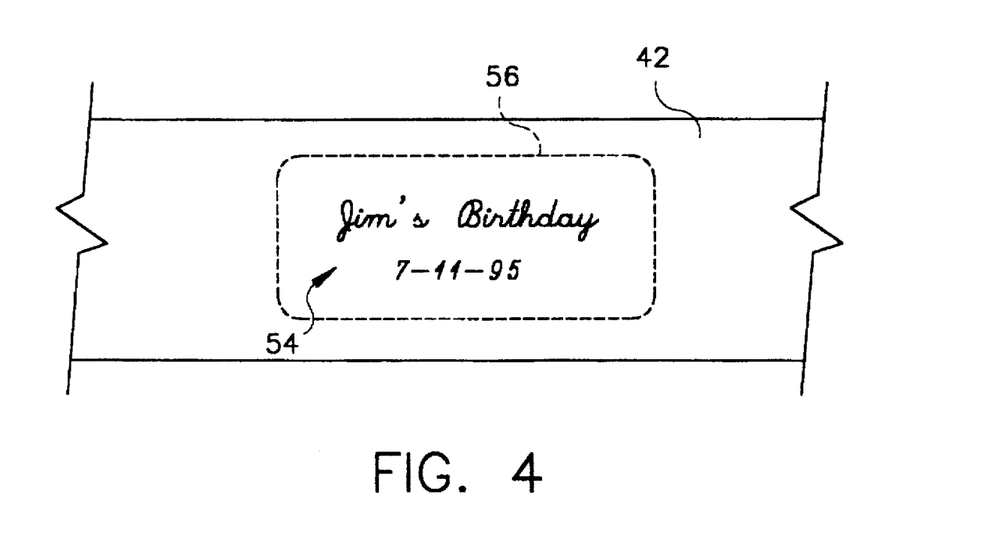
FIG. 4 is a top view of a photographic filmstrip with hand-generated information recorded on the magnetic layer.

FIG. 4 displays filmstrip 42 with hand-generated information 54 magnetically recorded on the magnetic layer of the filmstrip. Of course information 54 would not be visible to the unaided human eye, but it has been made visible in the drawings to aid in the explanation of the invention. A dotted line 56 is provided in the figure merely to show the available writing area of write on portion 30. The dotted line is not actually recorded on the film in any manner.

Figure 5:
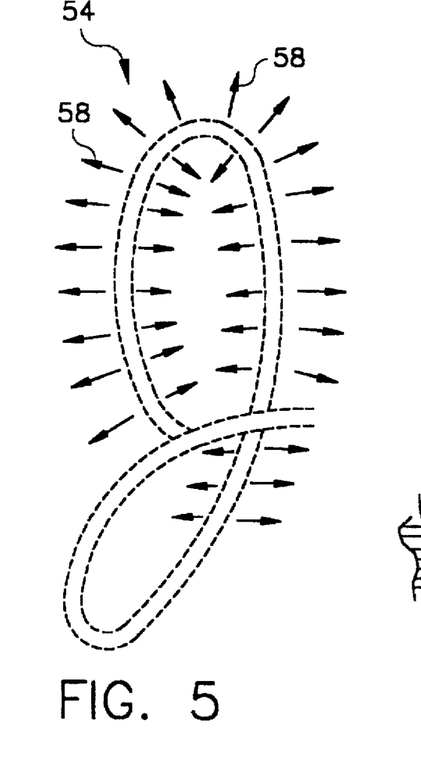
FIG. 5 is a schematic representation of hand-generated information recorded on a magnetic layer.
Figure 6:
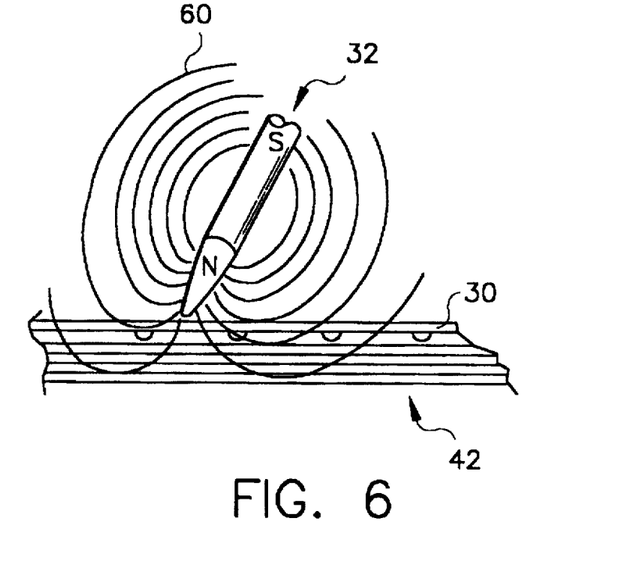
FIG. 6 is similar to FIG. 3 and displays magnetic field lines emanating from a magnetic stylus.

FIG. 5 discloses a portion of information 54, namely the letter "J" from the word "Jim's". Only the field from the stylus which is in the plane of the magnetic media actually magnetizes the magnetic layer. Arrows 58 represent magnetic field vectors of the information recorded in the magnetic layer. FIG. 6 discloses how a magnetic field 60 from stylus 32 emanates away from the stylus, passes through write on portion 30, and permeates filmstrip 42 to record the magnetic field in the magnetic layer of the filmstrip.

Figure 7:
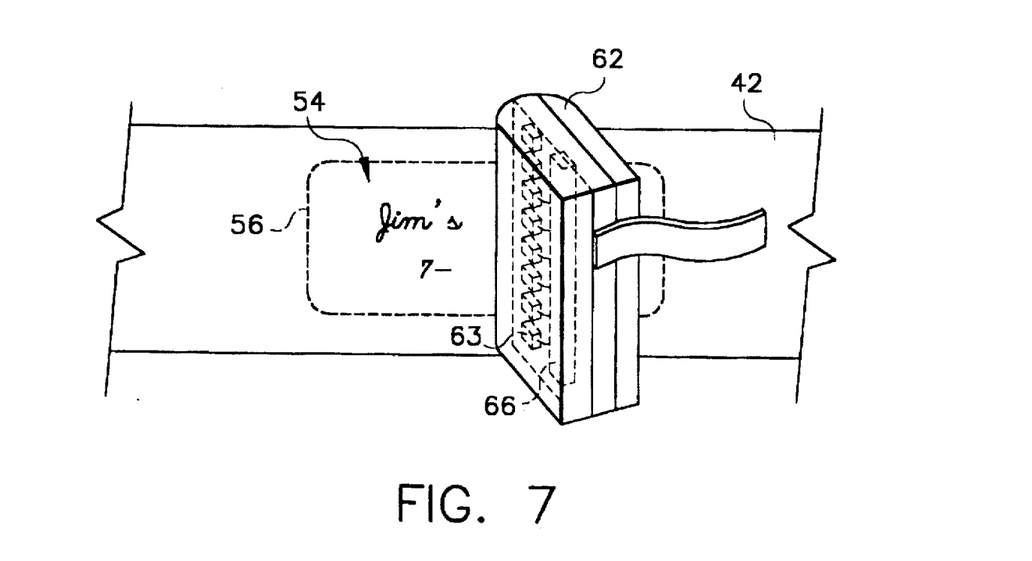
FIG. 7 is a schematic perspective view of a magnetic head array scanning a magnetic layer of a filmstrip.
Figure 8:
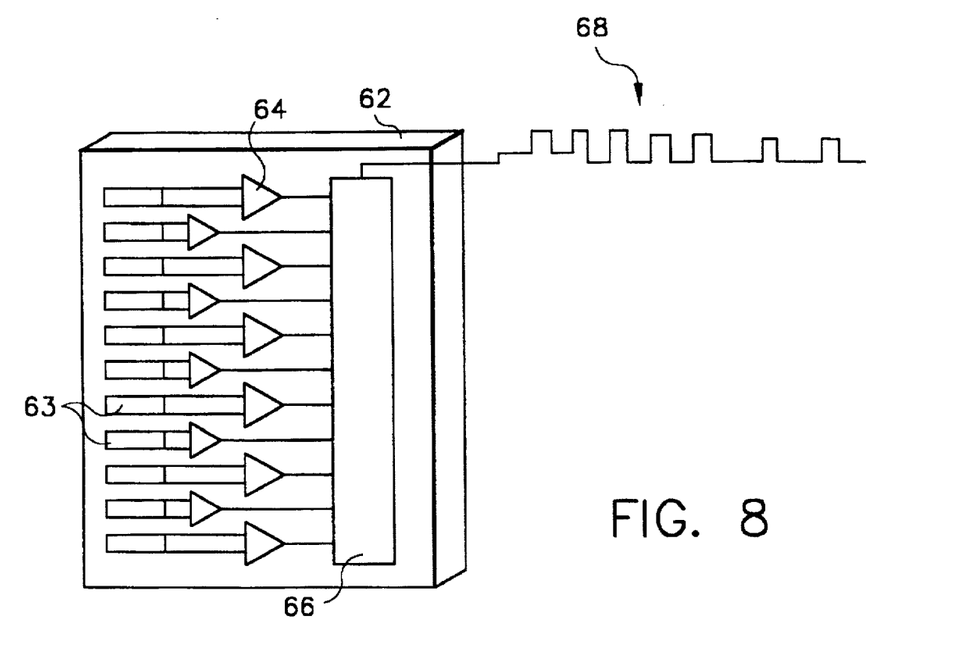
FIG. 8 is a side view of the magnetic head array of FIG. 7 outputting serial data.

With reference to FIGS. 7 and 8, after filmstrip 42 is removed from the camera, the filmstrip is developed to render visible the latent images recorded on the photo-chemical layer(s) of the filmstrip. Filmstrip 42 is then passed by a magnetic FAX head 62 which includes a plurality of magnetic heads 63. The magnetic layer of the filmstrip is closer to the magnetic FAX head than the photo-chemical layer(s). The housing has been made transparent to facilitate viewing. The electrical output of each magnetic head in the array is amplified by an amplifier 64 and integrated by a multiplexer 66 which results in a serial data output 68 from the multiplexer. Serial data output 68 is similar to the serial data output from a charged coupled device (CCD) sensor used in a conventional facsimile machine, thus explaining the use of the term "magnetic FAX head" 62. As the film moves past the magnetic FAX head, signal 68 is clocked out of multiplexer 66 at a rate proportional to the relative speed of filmstrip 42 past magnetic FAX head 62. Signal 68 therefore represents a picture of the hand generated information recorded on the magnetic layer of the filmstrip.

Figure 9:
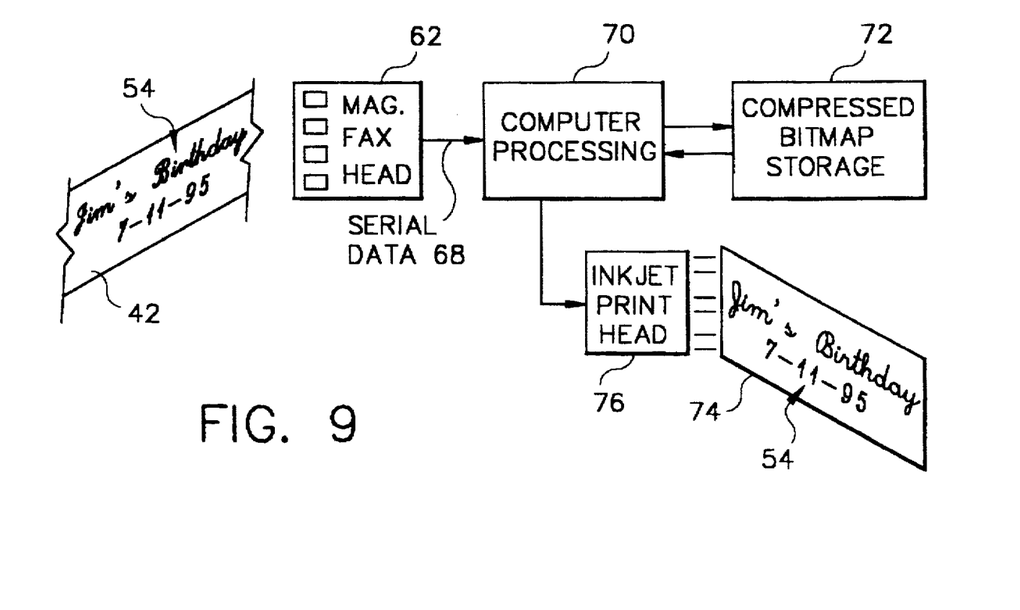
FIG. 9 is a block diagram representing how hand-generated information on a filmstrip is printed onto a photograph.

FIG. 9 is a block diagram disclosing how the hand-generated information recorded on filmstrip 42 is utilized. After magnetic FAX head 62 scans film 42 to read hand-generated information 54 recorded on the magnetic layer of the filmstrip, serial data 68 from the magnetic FAX head is transferred to a microprocessor 70. The microprocessor 70 compresses the serial data and stores the compressed serial data in a memory 72. A photograph 74, which corresponds to hand-generated information 54, is created from a developed image located adjacent hand-generated information 54 on filmstrip 42. Microprocessor 70 retrieves the compressed serial data from memory 72, decompresses the serial data, and uses the serial data for controlling an inkjet printhead 76 to record the hand generated information on the back of photograph 74. The hand-generated information can alternatively be printed on the image side of the photograph in a border or superimposed over the image by using a linear light emitting diode print head to expose the photographic paper from which photograph 74 is made.

Figure 10:
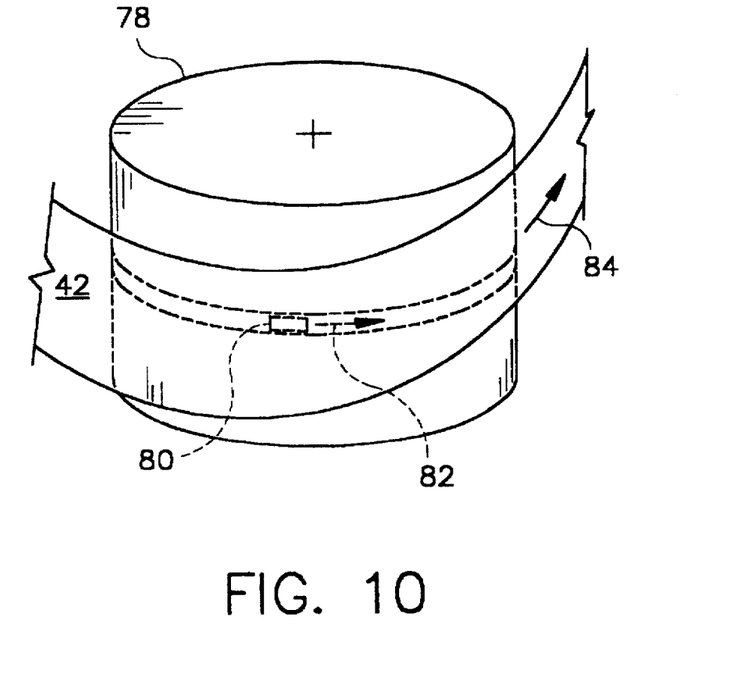
FIG. 10 is a schematic view of a helical scanner for reading hand-generated information from the magnetic layer of a photographic filmstrip.

FIG. 10 disclose an alternative method for reading the hand-generated information from the magnetic layer of filmstrip 42. A helical scanning head 78 includes a magnetic head 80. The helical scanning head is rotated rapidly in the direction of an arrow 82 while filmstrip 42 is transported past helical scanning head 78 in the direction of an arrow 84. Serial data from magnetic head 80 will have a large amount of skew which is removed by microprocessor 70 (FIG. 9). Such a helical scanner is similar to helical scanners used in video tape players. Transverse scanning, which is another form of helical scanning, can also be used to read the hand-generated information from the magnetic layer of the filmstrip.

Figure 11:
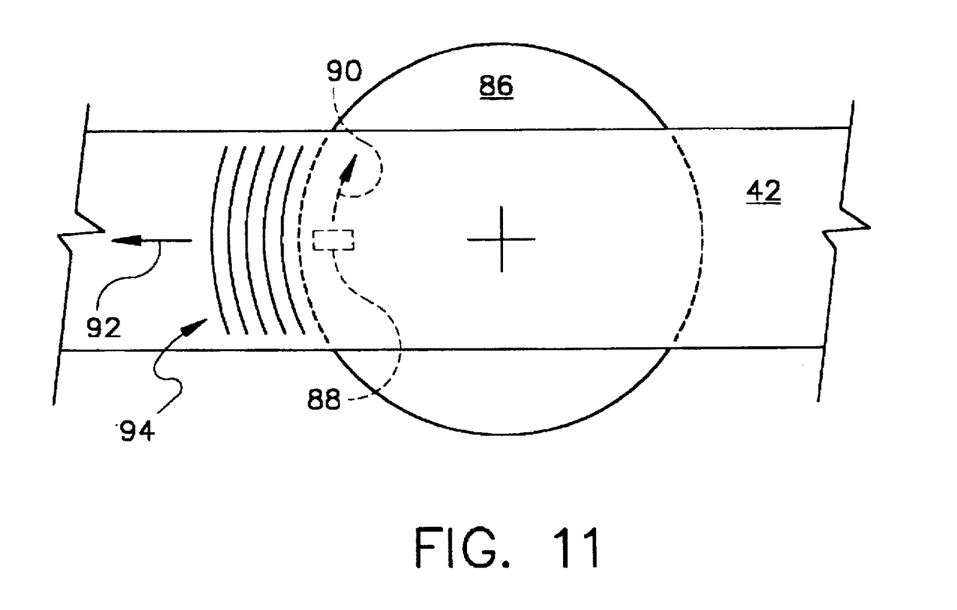
FIG. 11 is a schematic view of an arcuate scanner for reading hand-generated information from the magnetic layer of a photographic filmstrip.

FIG. 11 discloses a still further alternative method for reading the hand-generated information from the magnetic layer of filmstrip 42. An arcuate scanning head 86 includes a magnetic head 88. The arcuate scanning head is rotated rapidly in the direction of an arrow 90 while filmstrip 42 is transported past arcuate scanning head 86 in the direction of an arrow 92. Serial data from magnetic head 88 will be distorted by the curvature of the scan path (represented by curved lines 94). The distorted serial data can be corrected computationally by microprocessor 70 (FIG. 9) or by providing an inkjet print head with a curvature similar to the curvature of the scan path.

Figure 12:
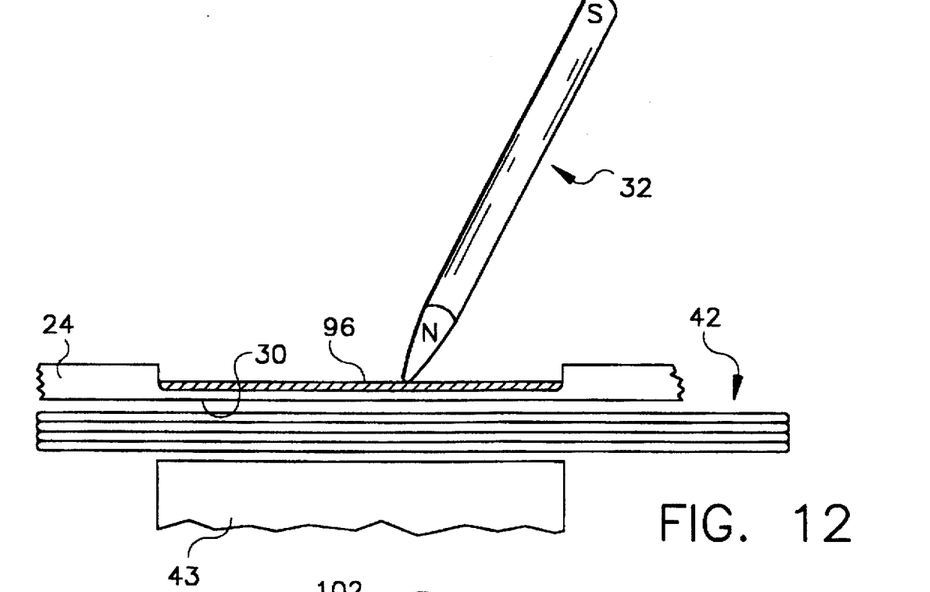
FIG. 12 is a similar view to FIG. 3 and represents an alternative embodiment of the present invention.

Turning now to FIG. 12, a further feature of the present invention will be described. FIG. 12 is similar to FIG. 3 except that dimples 45 have been removed and write-on portion 30 has been provided with an additional magnetic viewing layer 96. Layer 96 comprises a pair of thin, transparent plastic sheets in between which is sealed a light colored powder or liquid filled with soft or weakly magnetic particles. The magnetic particles are preferably dark in color. When stylus 32 is moved on layer 96 in a pattern, the magnetic particles, under the influence of the magnetic field emanating from stylus 32, assume the pattern drawn by the stylus. The dark magnetic particles are set off against the light colored powder or liquid, and are thus visible through the transparent plastic sheet. As such, the camera operator can see the hand-generated information that has been recorded on the magnetic layer of the filmstrip. This aspect of the invention is comparable to several children's toys on the market. A suitable material for magnetic viewing layer 96 is made by Eurand America.

Figure 13:
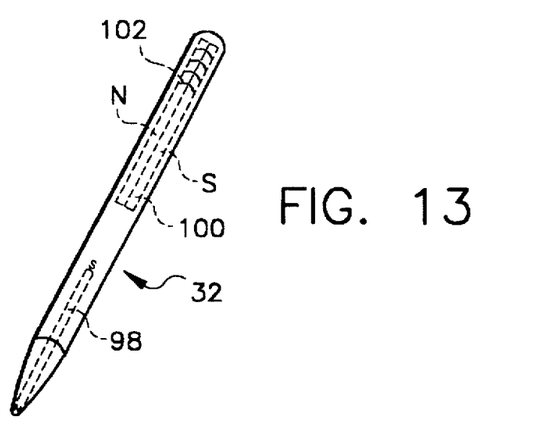
FIG. 13 is an alternative embodiment of a magnetic stylus which can erase magnetically recorded information.

FIG. 13 discloses an alternative embodiment of stylus 32. The stylus includes a first permanent magnet 98 which emits a magnetic field for recording hand-generated information on the magnetic layer of the filmstrip. Stylus 32 also has a second permanent magnet 100 for erasing hand generated information from the magnetic layer. Magnet 100 has elongated north and south poles N, S and emits an elongated magnetic field designated by arrows 102. To erase hand-generated information from the magnetic layer of the filmstrip, the stylus is positioned such that magnet 100 is adjacent the write-on portion and the long axis of magnet 100 is parallel to the plane of the write-on portion. The stylus is then swept across the write-on portion, thereby erasing hand-generated information recorded in the magnetic layer of the filmstrip.

Figure 14:
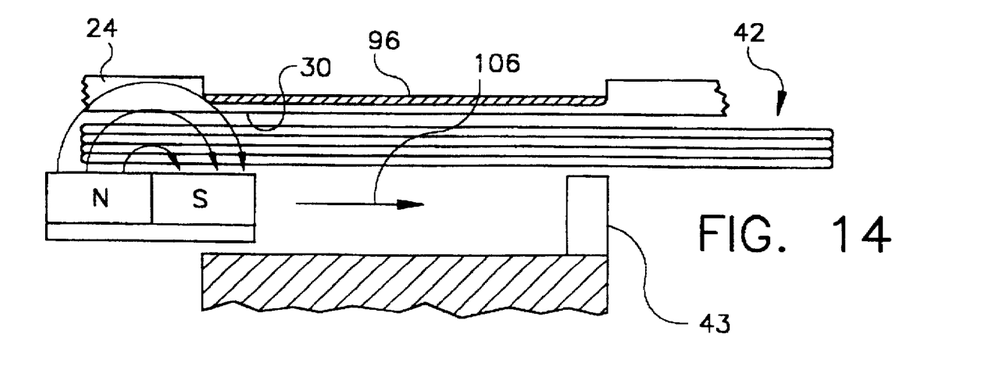
FIG. 14 is an alternative embodiment of FIG. 12 in which a magnetic eraser has been added to the camera.

FIG. 14 is an alternative embodiment of FIG. 12 in which a magnetic eraser 104, similar to magnet 100 in FIG. 13, is provided in the camera. A portion of film rail 43 has been removed to facilitate viewing. Magnetic eraser 104 includes a magnet having elongated north and south poles N, S which extend into and out of the plane of the paper on which FIG. 14 is located. Magnetic eraser is moved in the direction of an arrow 106 to erase hand generated information recorded on the magnetic layer of filmstrip 42. Magnetic eraser can be moved manually by a knob which extends outside the camera body and is attached to magnetic eraser 104. A spring can be used to bias the magnetic eraser to its home position shown in FIG. 14. Alternatively, a camera motor can be used for powered movement of the magnetic eraser. A permanent magnetic material suitable for use as the magnetic eraser is disclosed in U.S. Pat. No. 4,893,208 which issued on Jan. 1, 1990 in the name of McClure, and which is incorporated herein by reference.

Figures 15, 16:
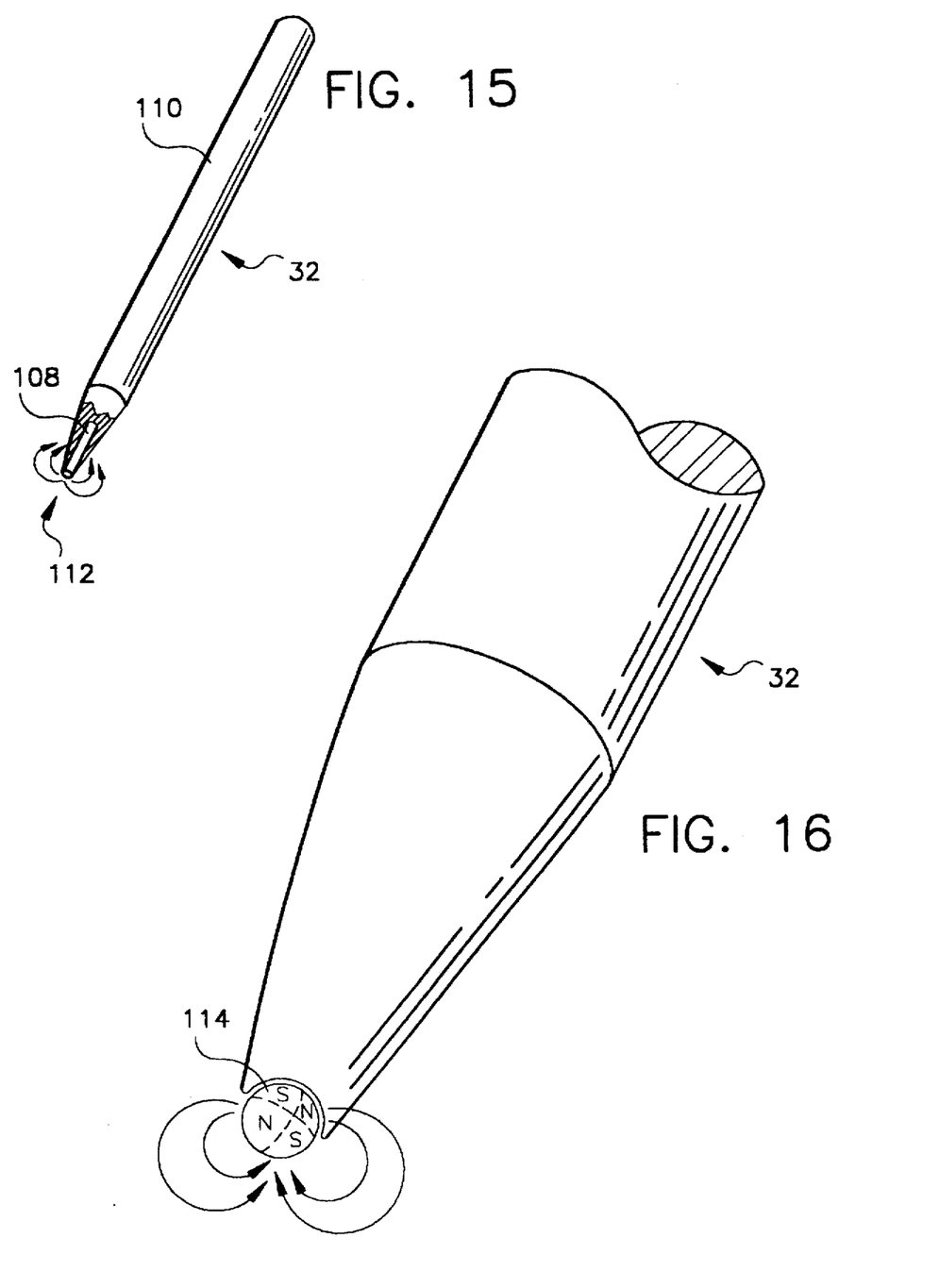
FIGS. 15 and 16 display alternative embodiments of magnetic styli.

Turning to FIG. 15, further description of magnetic stylus 32 will be provided. In this embodiment a small permanent magnet 108 is secured to one end of a stylus body 110 which is made of a non-magnetic material such as aluminum. The spreading of the magnetic field 112 is determined by the length of the magnet. The shorter the magnet the more confined the magnetic field surrounding the magnet and the sharper the line written by the stylus. However, as the length of the magnet is reduced, so too is the magnetic field strength. A balance must be reached such that the magnetic field is strong enough to magnetize the film but not so large that the width of the track recorded by the stylus is so wide that the hand-generated information is not readable.

FIG. 16 discloses a still further embodiment of stylus 32. In this embodiment, a spherical permanent magnet 114 is secured for rotation to one end of stylus 32, much like a ball point pen. The sphere should have two or more magnetic poles N, S, and the magnetic field emanating from spherical magnet 114 must be strong enough to reach through the camera write-on portion to record hand-generated information on the magnetic layer of the filmstrip.

Figure 17:
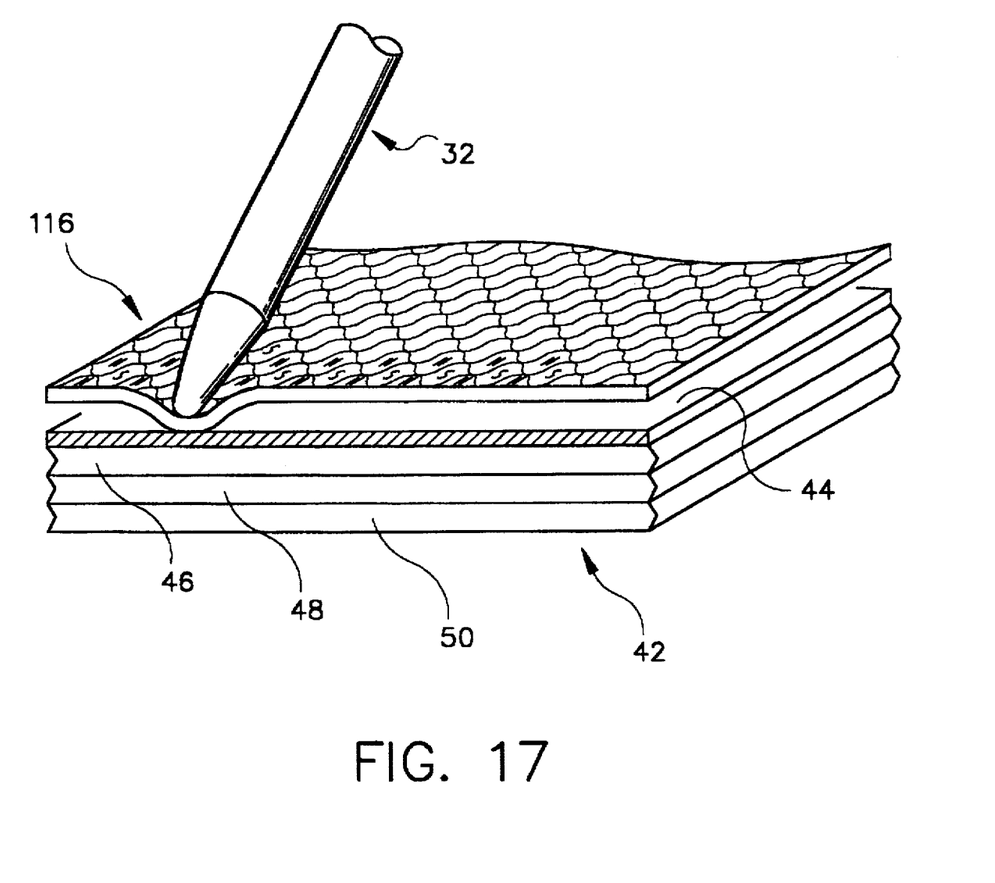
FIG. 17 is a perspective view of a still further embodiment of the present invention.

Turning to FIG. 17, a further embodiment of the present invention will be described. In this embodiment, the write-on portion of the camera is replaced by a magnetic layer of rubber 116 containing magnetic particles such as barium or strontium-ferrite. A non-magnetic stylus, made of plastic or aluminum, is used in conjunction with the rubber magnetic layer. Filmstrip 42 is spaced a small distance (e.g. 2 mm) from magnetic rubber layer 116. When the camera operator writes with the stylus on rubber layer 116, the portion of the rubber layer under the stylus is pressed closer to filmstrip 42. As such, a magnetic signal is recorded on magnetic layer 46 of filmstrip 42 wherever magnetic rubber layer 116 has been pressed closer to the filmstrip by the stylus. Accordingly, hand-generated information is recorded on the magnetic layer of the filmstrip.

It should be noted that the magnetic layer on the filmstrip may include one or more tracks adjacent one or both edges of the filmstrip. These tracks may have information which was recorded on them by a magnetic head in the camera and/or another piece of equipment. It is important that provision be made to prevent the magnetic stylus of the present invention from altering information recorded on these tracks. One method of achieving this goal is to design the magnetic-film-write-on portion such that it does not overlap the magnetic tracks. In this case, the back wall of the camera should be designed to prevent the stylus from getting close enough to the magnetic tracks to alter data on the tracks. Alternatively, small bars made of a soft magnetic material such as iron or permalloy can be positioned at the top and bottom of the write-on portion to shield the magnetic tracks from the magnetic field emitted from the stylus. Of course, the embodiment described above having a magnetic eraser in the camera would also have to shield any magnetic tracks from the eraser's magnetic field.

The invention has been described with reference to a preferred embodiment. However, it will be appreciated that variations and modifications can be effected by a person of ordinary skill in the art without departing from the scope of the invention.

PARTS LIST 20 camera
22 camera body
24 rear wall
26 view finder
28 shutter button
30 write-on portion
32 magnetic stylus 34 recess
36 bosses
38 hinged door
40 cartridge
42 photographic filmstrip
43 film rails
44 anti-static layer
45 dimples
46 magnetic layer
48 base layer
50 photochemical layer(s)
52 outer surface
54 hand-generated information
56 dotted line
58 arrows
60 magnetic field
62 magnetic FAX head
64 amplifier
66 multiplexer
68 serial data output
70 microprocessor
72 memory
74 photograph
76 inkjet printhead
78 helical scanning head
80, 88 magnetic heads
82, 84, 90, 92 arrows
86 arcuate scanning head
94 curved lines
96 magnetic viewing layer
98, 100, 108 permanent magnets
102, 106 arrows
104 magnetic eraser
110 stylus body
112 magnetic field
114 spherical permanent magnet
116 rubber magnetic layer

We claim:

1. A method of writing hand-generated information on a filmstrip in a camera, comprising the steps of:

loading a filmstrip which has a substantially transparent magnetic layer into the camera;

moving successive sections of the filmstrip inside the camera to locate corresponding sections of the magnetic layer adjacent an inside face of a magnetic-film-write-on portion of the camera; and manually moving a hand held stylus on an outside face of the magnetic-film-write-on portion, opposite the inside face, to record hand-generated information magnetically on the magnetic layer.

2. The method of claim 1, further comprising the steps of:

removing the filmstrip from the camera;

developing the filmstrip to render visible one or more latent images recorded on the filmstrip, at least one of the latent images being associated with the hand-generated information recorded on the magnetic layer;

reading the recorded hand-generated information from the magnetic layer;

creating one or more photographs from the visible images on the filmstrip; and printing the read hand-generated information on at least one of the photographs.

3. In combination, a camera and a stylus for writing hand-generated information on a filmstrip in the camera, characterized in that:

the filmstrip includes a transparent magnetic layer, the stylus is releasably secured to the camera and emits a magnetic field, and the filmstrip is positionable adjacent a first side of a magnetic-film-write-on portion of the camera, the write-on portion being sufficiently thin such that when the stylus is positioned adjacent a second side of the write-on portion and moved in a pattern, the pattern is recorded on the magnetic layer via the magnetic field emitted from the stylus.

4. The apparatus of claim 3, wherein the write-on portion of the camera is about 1 millimeter thick.

5. The apparatus of claim 3, further comprising:

a door movable between a closed position covering the second side of the write-on portion, and an open position exposing the second side of the write-on portion.

6. The apparatus of claim 3, wherein when an end of the stylus is in contact with the second side of the write-on portion, the stylus emits a magnetic field with a strength of about 920 gauss or greater at the magnetic layer of the filmstrip.

7. The apparatus of claim 3, wherein the stylus has a permanent magnet for generating the magnetic field.

8. A camera having means for receiving a photographic filmstrip with a magnetic recording layer, is characterized in that:

a wall of the camera includes a magnetic-film-write-on portion which is made of a compliant magnetic material that emits a magnetic field, such that when the filmstrip is positioned adjacent the write-on portion of the wall, the compliant magnetic material can be moved towards the filmstrip in a pattern to record the pattern magnetically on the magnetic recording layer.

9. The camera of claim 8, further including a stylus, releasably secured to the camera, used to press against the compliant magnetic material to create the pattern.

10. A camera having means for receiving a photographic filmstrip with a magnetic recording layer, is characterized in that:

a wall of the camera includes a magnetic-film-write-on portion adjacent one side of which a hand-held stylus can be moved to record hand-generated information magnetically on the magnetic layer, the write-on portion including a layer of movable magnetic particles which assume a pattern similar to the hand-generated information as the hand-generated information is recorded on the magnetic layer, such that the hand generated information can be viewed by observing the magnetic particles.

11. The method of claim 1, further comprising the step of:

preventing data recorded on one or more magnetic tracks located adjacent one or more edges of the filmstrip from being unintentionally altered.

* * * * *